No. 685,180. Patented Oct. 22, 1901.
W. H. SEWELL.
TIRE FOR VEHICLES.
(Application filed May 10, 1901.)
(No Model.)
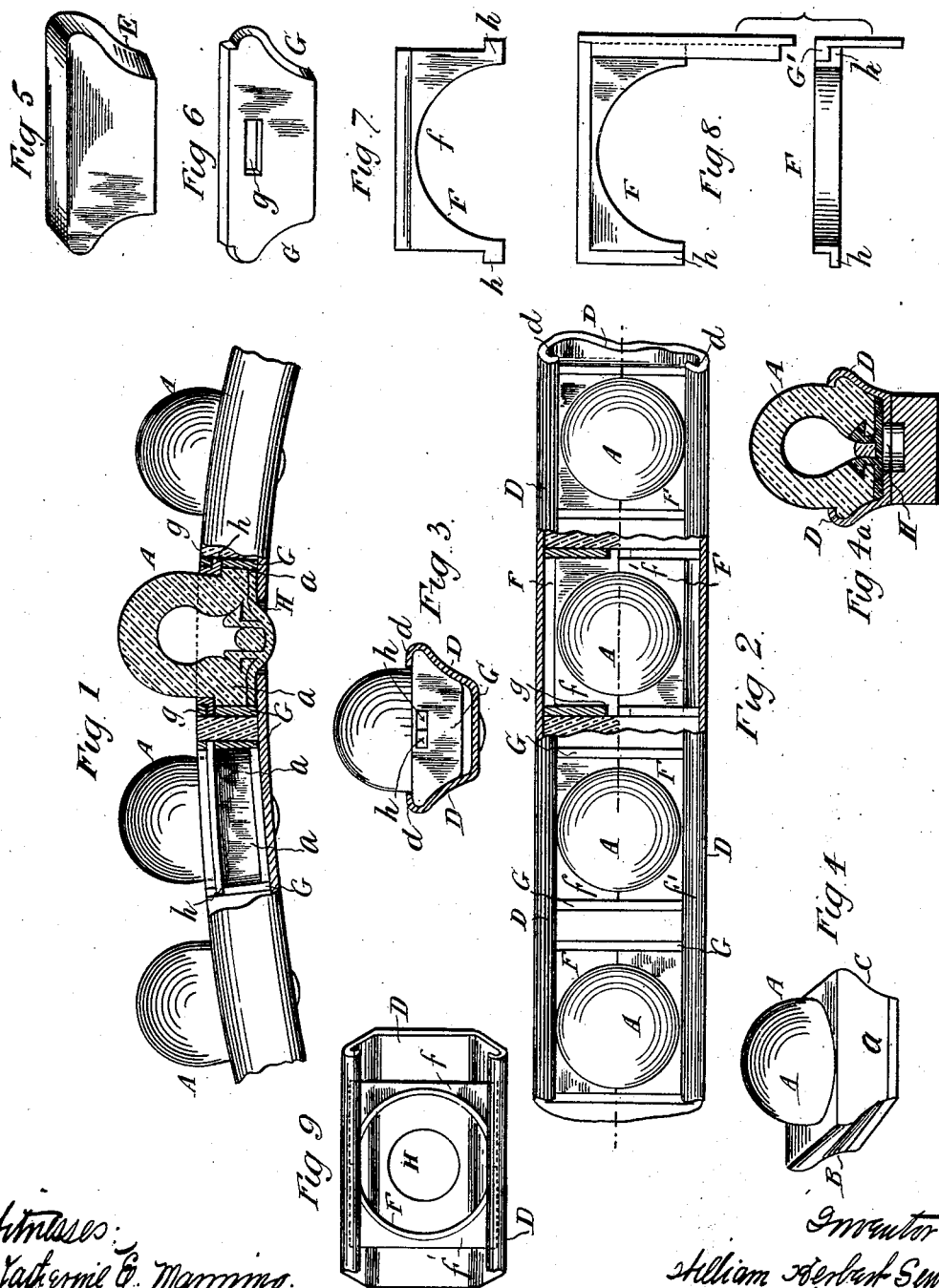

UNITED STATES PATENT OFFICE.

WILLIAM HERBERT SEWELL, OF BELFAST, IRELAND.

TIRE FOR VEHICLES.

SPECIFICATION forming part of Letters Patent No. 685,180, dated October 22, 1901.

Application filed May 10, 1901. Serial No. 59,656. (No model.)

*To all whom it may concern:*

Be it known that I, WILLIAM HERBERT SEWELL, general produce merchant, of 85 Victoria street, Belfast, Ireland, have invented new and useful Improvements in and Connected with the Tires of Vehicles, of which the following is a specification.

My invention relates to vibration and noise absorbing tires, and is a further development of my prior patents, No. 620,507, A. D. 1899, and No. 648,802, A. D. 1900, consisting in a somewhat modified form of rubber segment and differing form of attachment, and more especially applicable to horse, motor, and the heavier style of vehicle.

Figure 1 is a side elevation, partly in section, of a portion of a tire made in accordance with and constituting my invention. Fig. 2 is a plan of same. Fig. 3 is a transverse section and end view of Fig. 1. Fig. 4 is a perspective view of the rubber segment or ball. Fig. 4$^a$ is a cross-section of wooden felly, showing rim, ball, and expansion. Fig. 5 is a perspective view of the rubber wedge or distance piece. Fig. 6 is a similar view of the intermediate metal piece forming transverse support for retaining-ring. Fig. 7 is a plan of one of the two members constituting one form of the retaining-ring. Fig. 8 is a plan and end view, respectively, of a modified form of ring and transverse supporting metal piece, the four last-mentioned figures being drawn to an enlarged scale. Fig. 9 is a plan of a further modification of retaining-ring with the divisions placed at an opposite angle and supported only by inturned edges of rim.

In conformity with my prior patents I build a tire up of a series of balls or semispherical or semispheroidal rubber segments with elongated or flattened or broadened bases and a concave or channel metal rim with inturned edges. The base of these rubber segments A on two opposite sides B and C, as seen in Fig. 4, is of same contour, or as nearly as possible the same, as the rim-channel D, and the elongated base $a$ of segment A at the said two opposite sides B and C rests upon a supporting or retaining ring, which is in its turn supported or turned by the inturned edges $d$ of rim D. The channel of the rim may be closely filled or packed with these rubber segments, so as to bring the bases of latter close together, or the segments may be placed at any desired distance apart, as shown in Figs. 1 and 2. In the latter case I provide a keystone, wedge, or distance piece E, Fig. 5, of rubber or other material, of same contour in cross-section as rim-channel D, which shall fill the vacant spaces in rim-channel caused by the segments being kept apart, and thereby lock same in required position. The segments are rigidly held within rim D by a series of encircling rings F in two halves $f$ and $f'$, which bear within or upon the overturned edges of rim longitudinally. These rings are or may be supported by transverse metal pieces G or G'. These transverse metal pieces are formed of conveniently thin metal provided with lateral slots or apertures $g$, Fig. 6, or bearing-ledges G', Fig. 8, or projecting ledges $h$, Figs. 7 and 8, with which the encircling ring F is provided, one at the opposite side of each member, enter or are borne and become locked within the said slot or ledge. The removal of the before-described distance-piece G will enable the retaining-ring to be divided and the rubber segments forming the tire to be removed or replaced. I also provide a free expansion of top of segment, sympathizing with any compression of running face or apex of segment, by providing a space or hole H for said expansion through or within rim D immediately opposite running apex of segment, so that pressure from ground-contact sufficient to change the original form of the segment is received and communicated to the base perpendicular to the point of said contact. The side wall of ball or segments A are thickened or strengthened, and the internal hollow or space is such as to prevent circumferential bulging or expansion, as will be seen from ball or segment A, illustrated in section in Fig. 1.

I claim—

1. In a vehicle-tire, the combination of segments or balls, a metal rim, inturned edges to said rim, elongated bases to said segments or balls, said elongated bases so shaped as to conform to and lie securely within the contour of the inturned edges of said rim, means for regulating the distance between said segments or balls; circular metal rings composed of two members, projections on each of said members, transverse plates so shaped as to conform to and lie securely within the contour of the inturned edges of said rim, longitudinal slots in said plates; said projections engaging said slots, whereby said rings are clamped about said segments or balls and the latter are removably secured to the rim.

2. In a vehicle-tire, the combination of segments or balls, a metal rim, inturned edges to said rim, elongated bases to said segments or balls, said elongated bases so shaped as to conform to and lie securely within the contour of the inturned edges of said rim, wedges or keystones of different sizes for regulating the distance between said segments or balls, circular metal rings composed of two members, projections on each of said members, transverse plates so shaped as to conform to and lie securely within the contour of the inturned edges of said rim; ledges in said plates, said projections engaging said ledges, whereby said rings are clamped about said segments or balls and the latter are removably secured to the rim.

3. In a vehicle-tire, the combination of segments or balls, a rim, inturned edges to said rim, elongated bases to said segments or balls, said bases conforming to the inturned edges of said rim; circular metal rings composed of two members, projections on each of said members, transverse plates so shaped as to conform to and lie securely within the contour of the inturned edges of said rim, longitudinal slots in said plates; said projections engaging said slots, whereby said rings are clamped about said segments or balls and the latter are removably secured to the rim; and holes in the base of said rim beneath said segments or balls, whereby a free expansion of the top of said segments or balls is permitted.

4. In a vehicle-tire, the combination of segments or balls, a rim, inturned edges to said rim, elongated bases to said segments or balls, said bases conforming to the inturned edges of said rim; circular metal rings composed of two members, projections on each of said members, transverse plates so shaped as to conform to and lie securely within the contour of the inturned edges of said rim, ledges in said plates; said projections engaging said ledges, whereby said rings are clamped about said segments or balls and the latter are removably secured to the rim; and holes in the base of said rim beneath said segments or balls, whereby a free expansion of the top of said segments or balls is permitted.

5. In a vehicle-tire, the combination of segments or balls, a rim, circular metal rings composed of two members, projections on each of said members, transverse plates so shaped as to conform to and lie securely within the contour of the inturned edges of said rim, longitudinal slots in said plates, said projections engaging said slots, whereby said rings are clamped about said segments or balls and the latter are removably secured to the rim; compression-chambers in said rim beneath said segments or balls and reinforcements to the sides of said segments or balls whereby when the same are compressed said sides will be free from bulging.

6. In a vehicle-tire, the combination of segments or balls, a rim, circular metal rings composed of two members, projections on each of said members, transverse plates so shaped as to conform to and lie securely within the contour of the inturned edges of said rim, ledges in said plates, said projections engaging said ledges, whereby said rings are clamped about said segments or balls and the latter are removably secured to the rim; compression-chambers in said rim beneath said segments or balls and reinforcements to the sides of said segments or balls whereby when the same are compressed, said sides will be free from bulging.

7. In a vehicle-tire, the combination with a rim, segments or balls seated in and conforming to the inturned edges of said rim, of circular rings composed of two members, projections on each of said members transverse plates also conforming to the inturned edges of said rim, said projections adapted to be engaged by said transverse plates whereby said rings are clamped about said segments or balls and the latter are removably secured to said rim; compression-chambers in said rim beneath said segments or balls and reinforcements to the sides of said segments or balls whereby when the same are compressed said sides will be free from bulging.

In testimony whereof I affix my signature in the presence of two witnesses.

WILLIAM HERBERT SEWELL.

Witnesses:
JOHN LIDDLE,
AGNES MACKINTOSH.